(12) United States Patent
Altschul et al.

(10) Patent No.: US 10,506,857 B2
(45) Date of Patent: Dec. 17, 2019

(54) ADHESIVE POCKET FOR MOBILE PHONES

(71) Applicant: Catalyst Medium Four, Inc., Austin, TX (US)

(72) Inventors: Matthew Timothy Altschul, Austin, TX (US); Michael J. Martin, Portland, OR (US); Beejan Soheili, Chula Vista, CA (US)

(73) Assignee: Catalyst Medium Four, Inc., Austin, TX (US)

( * ) Notice: Subject to any disclaimer, the term of this patent is extended or adjusted under 35 U.S.C. 154(b) by 148 days.

(21) Appl. No.: 15/643,191

(22) Filed: Jul. 6, 2017

(65) Prior Publication Data

US 2018/0184775 A1    Jul. 5, 2018

Related U.S. Application Data

(60) Provisional application No. 62/442,172, filed on Jan. 4, 2017.

(51) Int. Cl.
*A45C 11/00*   (2006.01)
*A45C 11/18*   (2006.01)
*A45C 13/00*   (2006.01)
*A45F 5/00*    (2006.01)
*H04M 1/21*    (2006.01)

(52) U.S. Cl.
CPC .......... *A45C 11/182* (2013.01); *A45C 13/002* (2013.01); *A45F 5/00* (2013.01); *A45C 2011/002* (2013.01); *H04M 1/21* (2013.01)

(58) Field of Classification Search
CPC ....... A45C 11/00; A45C 11/182; A45C 13/00; A45C 13/002; A45C 13/01; A45C 2011/002; A45C 2011/003; A45C 13/001; A45F 5/00; B65D 65/02; H04M 1/00; H04M 1/02; H04M 1/0281; H04M 1/0283; H04M 1/21
USPC ........ 206/320, 460; 150/122, 124, 132, 134, 150/141, 144, 147; 383/84, 86, 107; 455/575.1, 575.8
See application file for complete search history.

(56) References Cited

U.S. PATENT DOCUMENTS 1,521,897 A * 1/1925 Martin .................... A45F 3/042
                                                    383/86
2,580,712 A * 1/1952 Weisberg ............... B65D 33/02
                                                    383/107

(Continued)

FOREIGN PATENT DOCUMENTS

WO    2001024072 A1    4/2001

*Primary Examiner* — Bryon P Gehman
(74) *Attorney, Agent, or Firm* — Scheinberg & Associates, PC; John B. Kelly; Michael O. Scheinberg

(57) ABSTRACT

An adhesive pocket for mobile phones adapted in size and shape to carry credit-card-sized items, and method of making the same. The adhesive pocket includes a base having a front, a back, a first side, a second side, a top, and a bottom. The adhesive pocket includes an elastic sheet affixed to the back of the base, the elastic sheet wrapped around the first side of the base, sealed at the bottom of the base, and sealed at the second side of the base, thereby forming a pocket between the elastic sheet and the base. The adhesive pocket includes an adhesive layer disposed on the elastic sheet. The adhesive pocket includes a removable backing disposed on the adhesive layer, the removable backing configured to expose the adhesive layer when removed.

19 Claims, 11 Drawing Sheets

(56) References Cited

U.S. PATENT DOCUMENTS

| | | |
|---|---|---|
| D357,918 S | 5/1995 | Doria |
| 7,204,398 B1 | 4/2007 | Smith |
| D570,598 S | 6/2008 | Chan |
| D615,078 S | 5/2010 | Bradley |
| D619,130 S | 7/2010 | Fellig |
| D619,356 S | 7/2010 | Hillman |
| D624,064 S | 9/2010 | Esposito |
| D626,119 S | 10/2010 | Fellig |
| D631,246 S | 1/2011 | Boettner |
| 7,933,122 B2 | 4/2011 | Richardson et al. |
| D638,006 S | 5/2011 | Chang |
| D638,007 S | 5/2011 | Chang |
| D644,218 S | 8/2011 | Akana et al. |
| D647,697 S | 11/2011 | Littleton |
| 8,047,364 B2 | 11/2011 | Longinotti-Buitoni |
| D653,656 S | 2/2012 | Charnas et al. |
| 8,170,259 B2 | 5/2012 | Liu |
| 8,251,210 B2 | 8/2012 | Schmidt et al. |
| 8,256,568 B2 | 9/2012 | Lin |
| 8,295,043 B2 | 10/2012 | Tai et al. |
| D675,606 S | 2/2013 | Adelman et al. |
| 8,381,904 B1 | 2/2013 | Longinotti-Buitoni |
| D678,871 S | 3/2013 | Mishan et al. |
| D679,684 S | 4/2013 | Baker et al. |
| D681,620 S | 5/2013 | Huskinson |
| D681,949 S | 5/2013 | Kershenstein |
| D684,150 S | 6/2013 | Goradesky et al. |
| D688,654 S | 8/2013 | Stevinson |
| D688,655 S | 8/2013 | Rey-Hipolito et al. |
| 8,504,127 B2 | 8/2013 | Altschul et al. |
| D689,851 S | 9/2013 | Chang et al. |
| 8,528,690 B1 | 9/2013 | Wu |
| 8,718,730 B1 | 5/2014 | LaColla et al. |
| 8,726,952 B2 | 5/2014 | Jambunathan et al. |
| D707,965 S | 7/2014 | Requa |
| 8,781,541 B2 | 7/2014 | Dearden |
| 8,833,379 B1 | 9/2014 | Kaplan |
| D720,739 S | 1/2015 | Liu |
| D721,689 S | 1/2015 | Altschul et al. |
| 8,950,582 B2 | 2/2015 | Chang |
| D727,019 S | 4/2015 | DeChant |
| 9,027,746 B2 | 5/2015 | Smith |
| 9,176,532 B2 | 11/2015 | Tages et al. |
| D746,801 S | 1/2016 | Pan |
| D748,612 S | 2/2016 | Chan et al. |
| 9,362,968 B1 | 6/2016 | Haymond |
| D764,167 S | 8/2016 | DeChant |
| D764,449 S | 8/2016 | Chan et al. |
| 9,411,367 B2 | 8/2016 | Johnson et al. |
| 2002/0009195 A1 | 1/2002 | Schon |
| 2008/0010883 A1 | 1/2008 | Morgese |
| 2008/0023114 A1* | 1/2008 | Bridgefarmer .......... A45C 1/06 150/147 |
| 2008/0121322 A1 | 5/2008 | Thomson |
| 2009/0019444 A1 | 1/2009 | Kawachiya et al. |
| 2010/0122756 A1 | 5/2010 | Longinotti-Buitoni |
| 2010/0224519 A1 | 9/2010 | Kao |
| 2010/0230301 A1 | 9/2010 | Fellig |
| 2010/0331155 A1 | 12/2010 | Gorsuch et al. |
| 2011/0077061 A1 | 3/2011 | Danze et al. |
| 2011/0089078 A1 | 4/2011 | Ziemba |
| 2011/0309728 A1 | 12/2011 | Diebel |
| 2012/0021810 A1 | 1/2012 | Terry |
| 2012/0027237 A1 | 2/2012 | Lin |
| 2012/0067751 A1 | 3/2012 | Mongan et al. |
| 2012/0217257 A1 | 8/2012 | Ting |
| 2012/0264491 A1 | 10/2012 | Singhal |
| 2012/0294469 A1 | 11/2012 | Weaver |
| 2012/0303146 A1 | 11/2012 | Genov et al. |
| 2012/0327565 A1 | 12/2012 | Tages et al. |
| 2013/0037187 A1 | 2/2013 | D'Amore et al. |
| 2013/0095898 A1 | 4/2013 | Altschul et al. |
| 2013/0102368 A1 | 4/2013 | Lee |
| 2013/0170686 A1 | 7/2013 | Lester |
| 2014/0017436 A1 | 1/2014 | Vito et al. |
| 2014/0034546 A1 | 2/2014 | Ziemba |
| 2014/0045555 A1 | 2/2014 | Dearden |
| 2014/0050347 A1 | 2/2014 | Tsai |
| 2014/0148228 A1 | 5/2014 | Altschul et al. |
| 2014/0165379 A1 | 6/2014 | Diebel et al. |
| 2014/0166390 A1 | 6/2014 | Center et al. |
| 2014/0221056 A1 | 8/2014 | Gandhi et al. |
| 2014/0246355 A1 | 9/2014 | Azzoni |
| 2014/0251534 A1 | 9/2014 | Jambunathan et al. |
| 2014/0262853 A1* | 9/2014 | DeChant ................. A45C 1/06 150/132 |
| 2014/0323186 A1 | 10/2014 | Boosalis et al. |
| 2014/0364176 A1 | 12/2014 | Pintor |
| 2015/0027802 A1 | 1/2015 | Altschul et al. |
| 2015/0103018 A1 | 4/2015 | Kamin-Lyndgaard et al. |
| 2015/0334212 A1* | 11/2015 | Sandu ..................... H04M 1/21 455/575.1 |
| 2016/0044148 A1 | 2/2016 | Pizzo et al. |
| 2016/0262513 A1 | 9/2016 | O'Neill |
| 2016/0285497 A1 | 9/2016 | Roberts et al. |

* cited by examiner

ADHESIVE POCKET FOR MOBILE PHONES

This Application claims priority from U.S. Provisional Application No. 62/442,172, filed Jan. 4, 2017, which is hereby incorporated by reference. The present invention relates to accessories for portable electronic devices and mobile phones in particular.

BACKGROUND OF THE INVENTION

Technical Field of the Invention

The widespread use of portable electronic devices, and mobile phones in particular, has added another object to be carried by a person each day, typically in a pocket in a person's clothing. Carrying multiple items such as a phone, keys, wallet, etc. in a clothing pocket can be cumbersome. Some clothing does not have any pockets, in which case the mobile phone is carried in the hand. What is needed is an inexpensive and convenient way to combine the function of a wallet with a mobile phone so that only the mobile phone needs to be carried.

SUMMARY OF THE INVENTION

Embodiments of the present invention are directed to an adhesive pocket for mobile phones adapted in size and shape to carry credit-card-sized items. The adhesive pocket includes a base having a front, a back, a first side, a second side, a top, and a bottom. The adhesive pocket includes an elastic sheet affixed to the back of the base, the elastic sheet wrapped around the first side of the base, sealed at the bottom of the base, and sealed at the second side of the base, thereby forming a pocket between the elastic sheet and the base. The adhesive pocket includes an adhesive layer disposed on the elastic sheet. The adhesive pocket includes a removable backing disposed on the adhesive layer, the removable backing configured to expose the adhesive layer when removed.

Embodiments of the present invention are directed to a method of making an adhesive pocket for mobile phones adapted in size and shape to carry credit-card-sized items. The method includes providing a base having a front, a back, a first side, a second side, a top, and a bottom; affixing an elastic sheet to the back of the base; and forming a pocket between the elastic sheet and the base; disposing an adhesive layer on the elastic sheet; disposing a removable backing on adhesive layer, the removable backing configured to expose the adhesive layer when removed. The pocket is formed by wrapping the elastic sheet around the first side of the base; sealing the elastic sheet at the bottom of the base; and sealing the elastic sheet at the second side of the base.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Embodiments of the present invention are directed to an adhesive pocket adapted in size to carry credit-card sized items, including folded paper money, and suited for affixing to the back of a mobile smartphone, and a method of making the same. The adhesive pocket can be affixed to the back of a mobile phone or a protective case covering a mobile phone, enabling items to be carried within adhesive pocket while adhesive pocket is affixed to the mobile phone. The pocket is adapted in size to receive credit-card-sized items, folded paper bills, and the like.

Figure 1:
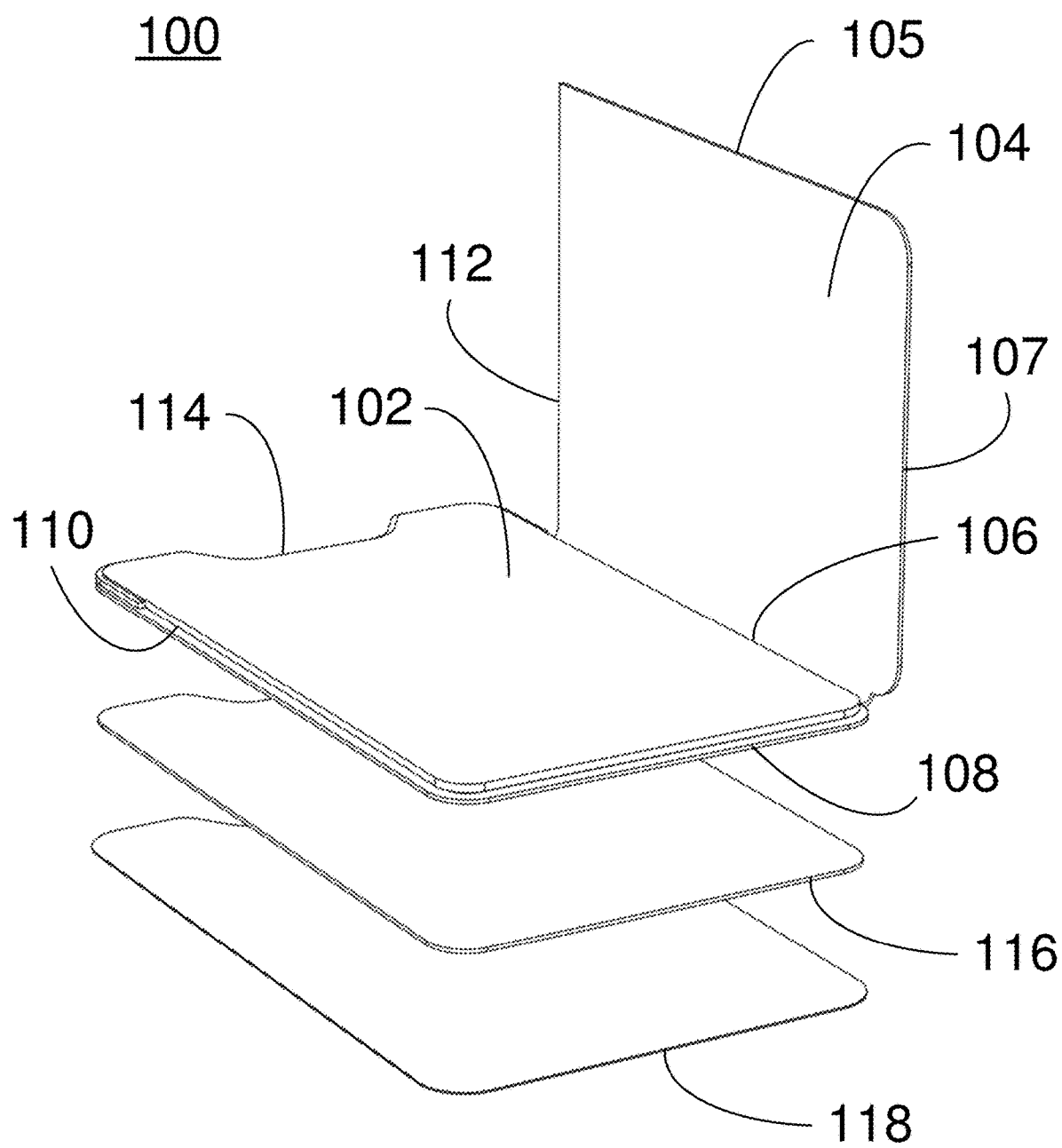
FIG. 1 is an exploded view showing the front, bottom, and left sides of constituent parts of an adhesive pocket in accordance with one or more embodiments of the present invention.

FIG. 1 is an exploded view showing the front, bottom, and left sides of constituent parts of an adhesive pocket in accordance with one or more embodiments of the present invention. Adhesive pocket 100 includes base 102, elastic sheet 104, adhesive layer 116, and removable backing 118. Base 102 provides structural support for the pocket. Base 102 is preferably more rigid than elastic sheet 104, but still flexible. Base 102, for example, can be comprised of thick paper, cardboard, polycarbonate, or any semi-flexible material. Elastic sheet 104, for example, can be comprised of Lycra®, spandex, elastane, or any other elastic material. Adhesive layer 116 preferably comprises a layer that is adhesive on both sides. One side of adhesive layer 116 is disposed on the back of elastic sheet 104. Adhesive layer 116 is not disposed on any part of base 102. Removable backing 118 is disposed on the other side of adhesive layer 116 to prevent the adhesive from adhering to other surfaces prior to application of adhesive pocket 100 to a mobile phone by a user. The user removes removable backing 118 to expose adhesive layer 116. The exposed surface of adhesive layer 116 is then applied by the user to the mobile phone or mobile phone case, thereby affixing the pocket to the mobile phone or phone case. In one exemplary embodiment, adhesive layer 116 can comprise 300LSE acrylic adhesive by 3M™. Adhesive layer 116 and removable backing 118 together can comprise an adhesive transfer tape.

Base 102 has a front and a back. The front of base 102 is shown in FIG. 1. The back of base 102 is not shown in FIG. 1. Elastic sheet 104 is securely affixed to the back of base 102 from side 110 to side 106. For example, elastic sheet 104 can be affixed to the back of base 102 by an adhesive. A portion of elastic sheet 104, including edges 105, 107, and 112, extends beyond the back of base 102 and wraps around side 106. The portion of elastic sheet 104 extending beyond the back of base 102 and wrapping around side 106 is sufficient in extent to wrap around the front side of base 102 and such that edge 105 of elastic sheet 104 reaches side 110 of base 102. The pocket is formed by wrapping elastic sheet 104 around base 102 as shown in FIG. 2.

Figure 2:
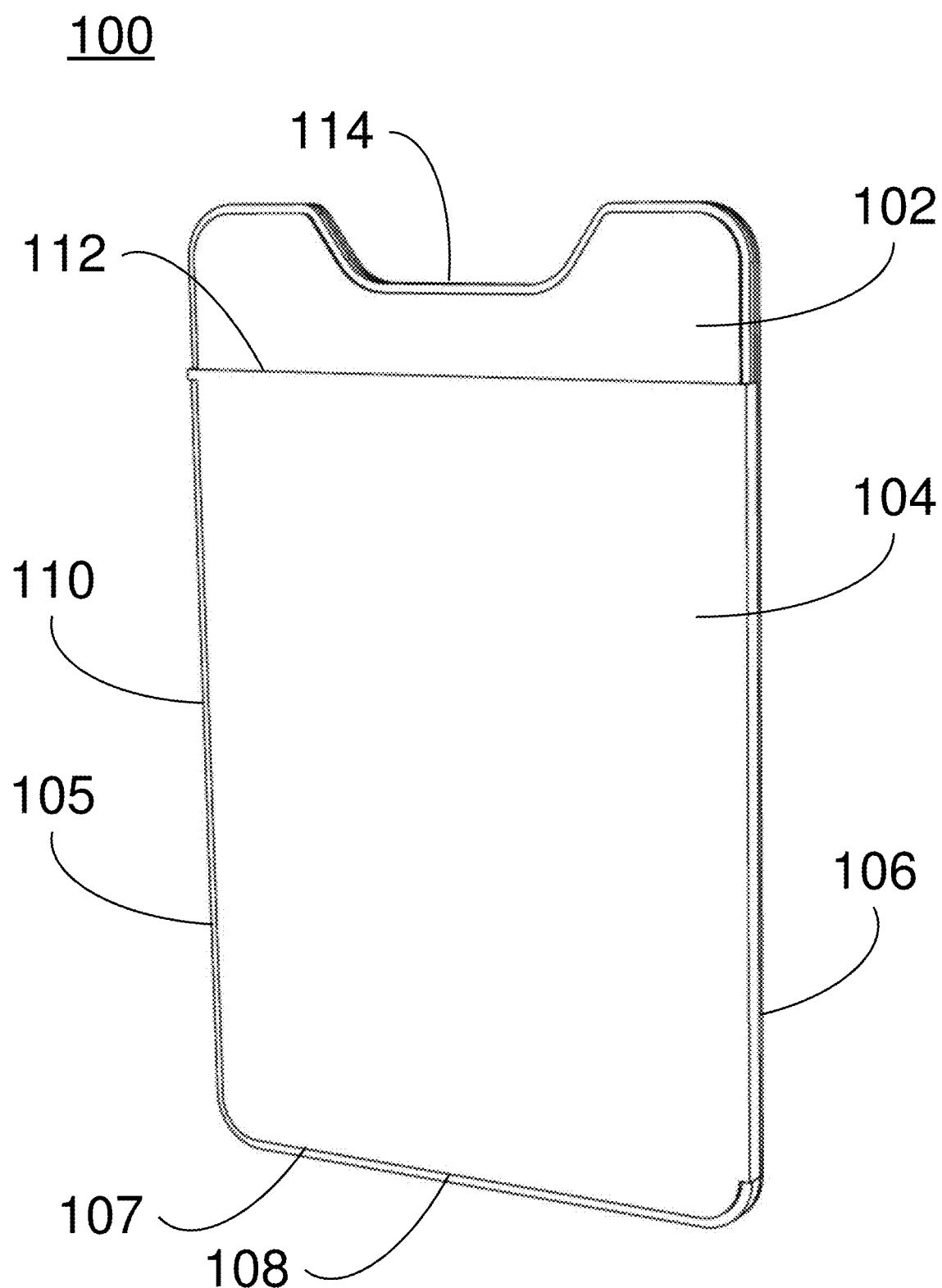
FIG. 2 is an oblique view showing the front, top, and right side of an adhesive pocket in assembled form in accordance with one or more embodiments of the present invention.

FIG. 2 is an oblique view showing the front, top, and right side of adhesive pocket 100 in assembled form. Edge 105 of elastic sheet 104 is affixed to base 102 at or near side 110. Edge 107 of elastic sheet 104 is affixed to base 102 at or near bottom 108. Elastic sheet 104 is not affixed to the rest of the front of base 102. Elastic sheet 104 being disposed in such a manner on base 102 forms a pocket between the front of base 102 and the unaffixed portion of elastic sheet 104. Edge 112 of elastic sheet 104 is unaffixed to the front of base 102. Edge 112 forms a pocket opening between elastic sheet 104 and the front of base 102 that is adapted in size and shape to receive credit-card-sized items, folded paper bills, and the like. Base 102 and/or elastic sheet 104 can have a surface texture that enhances the grip of the interior of the pocket, so that items disposed within the pocket are less likely to fall out of the pocket inadvertently. Adhesive pocket 100 can have a cutout portion 114 to facilitate the insertion and removal of items from the pocket. In at least one exemplary embodiment, cutout portion 114 is located at the top margin of base 102 and elastic sheet 104 does not have a cutout portion 114. In at least one exemplary embodiment, the top margin of base 102 extends beyond elastic sheet 104 and pocket opening 112.

Figure 3:
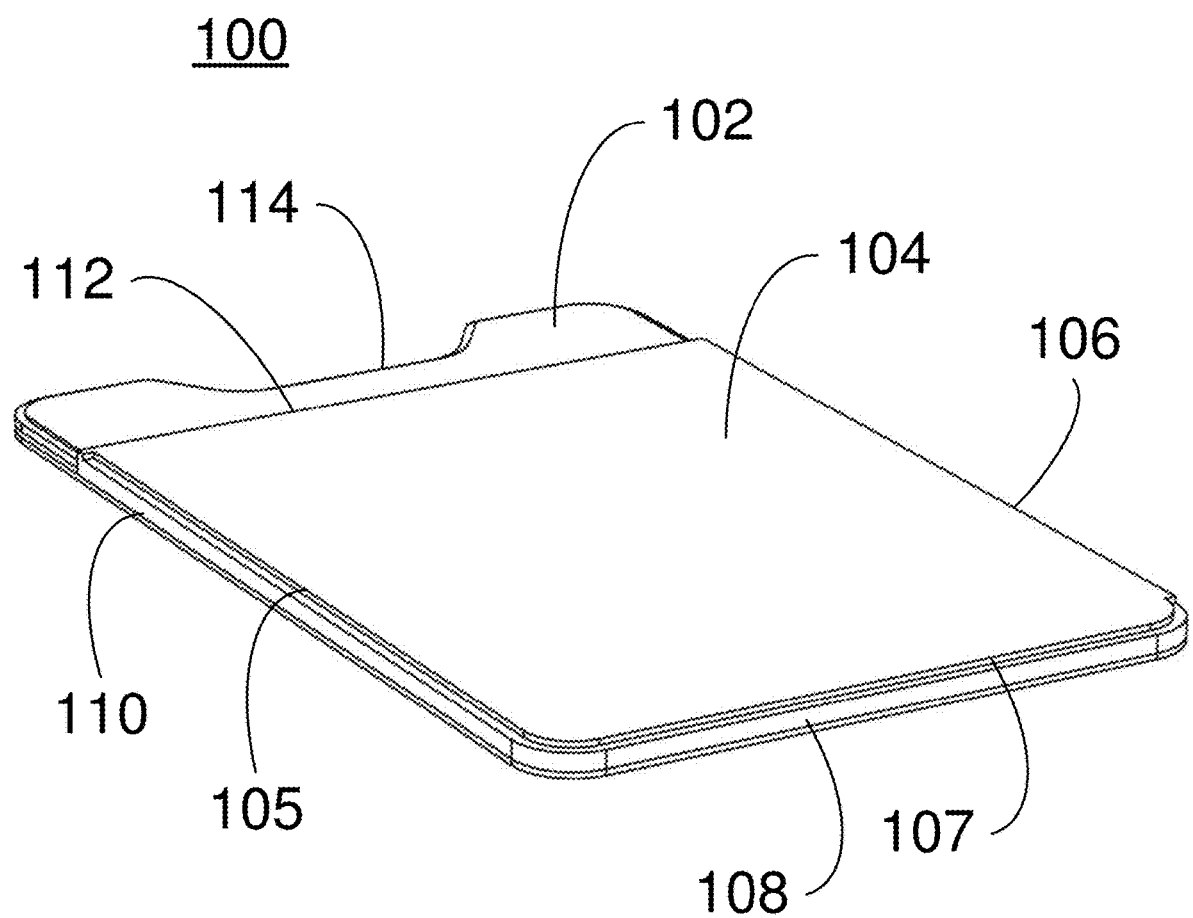
FIG. 3 is an oblique view showing the front, bottom, and left side of an adhesive pocket in accordance with one or more embodiments of the present invention.
Figure 4:
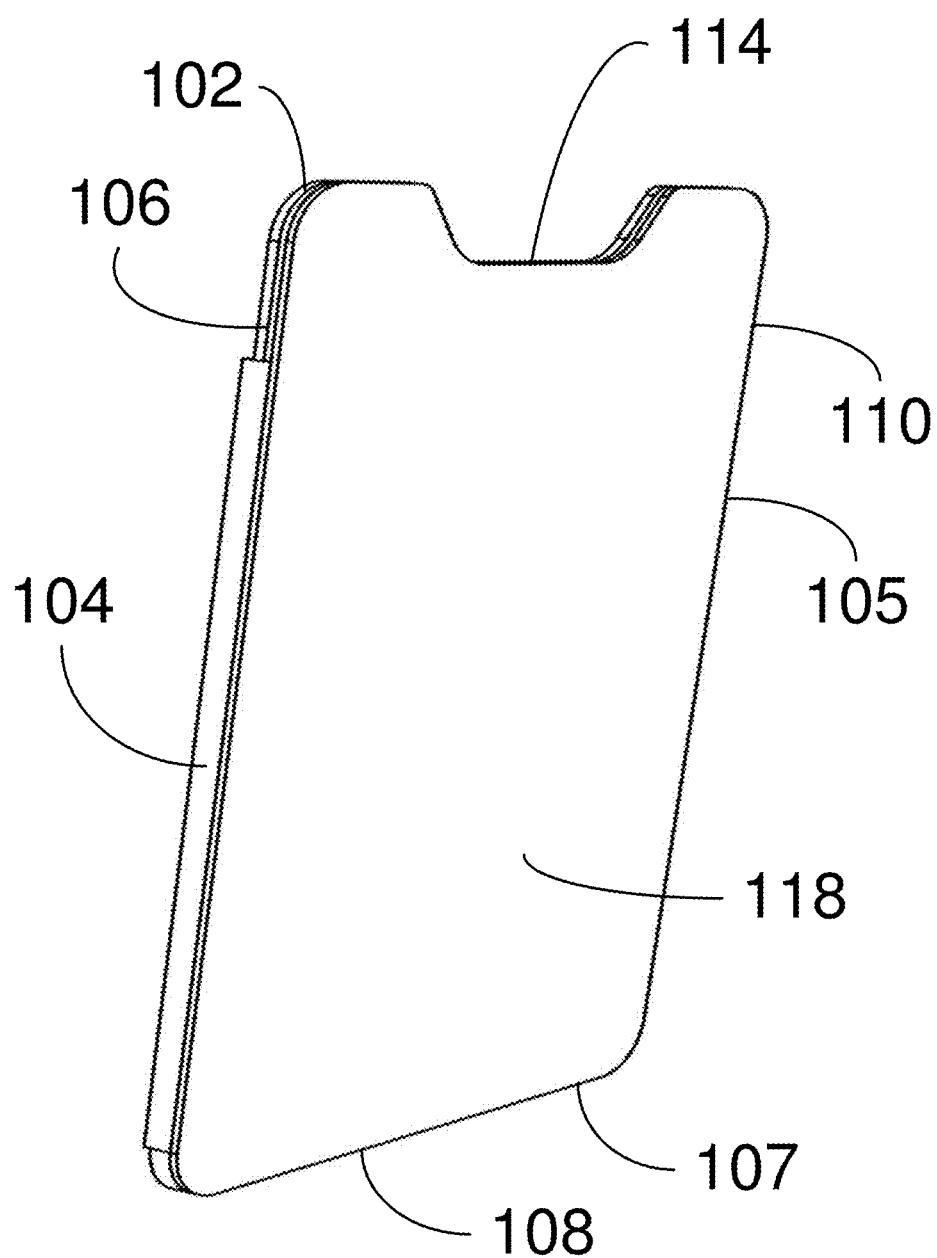
FIG. 4 is an oblique view showing the back, top, and right side of an adhesive pocket in accordance with one or more embodiments of the present invention.
Figure 5:
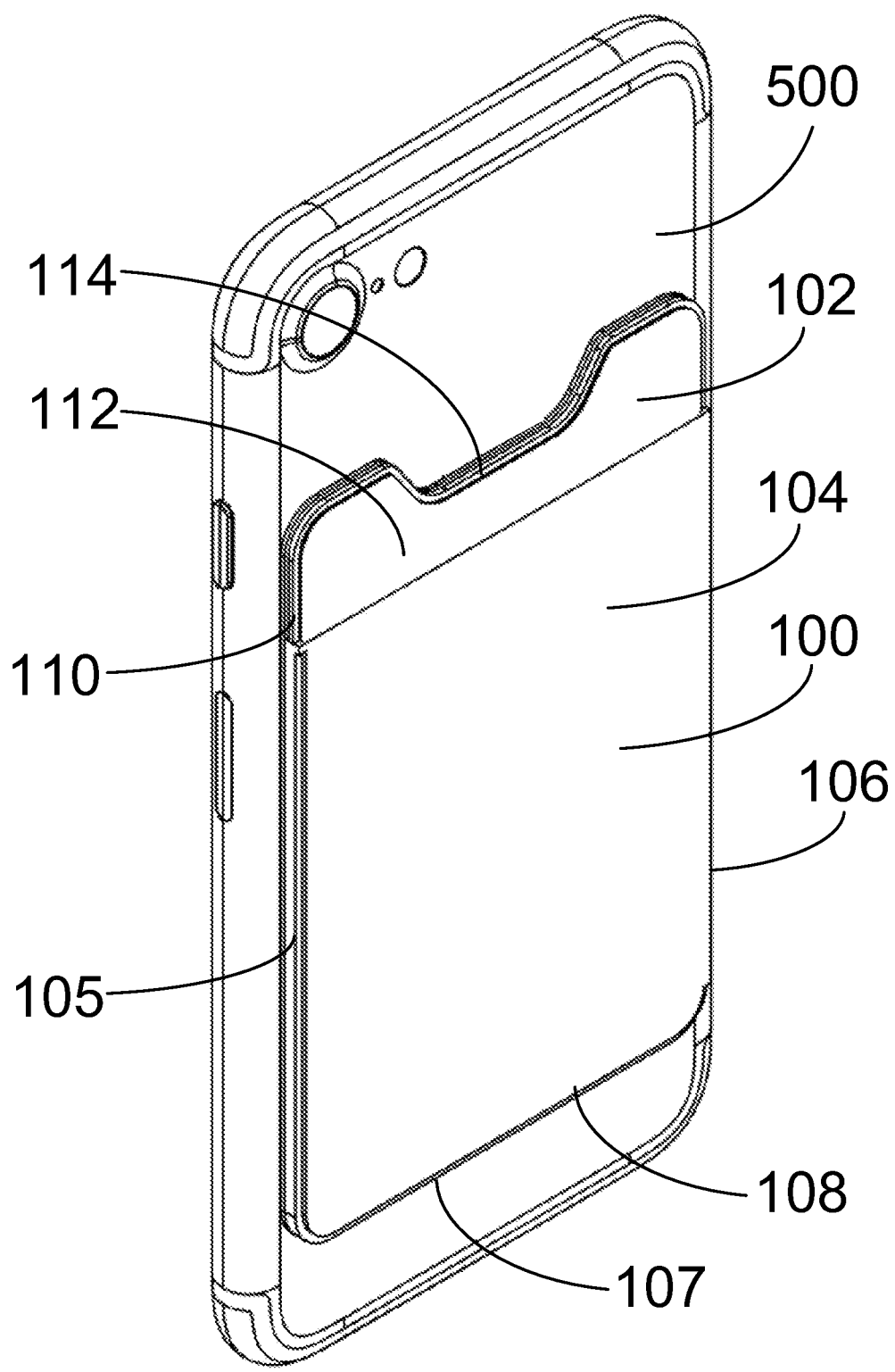
FIG. 5 is an oblique view showing the front, top, and left side of an adhesive pocket affixed to a mobile phone in accordance with one or more embodiments of the present invention.

FIG. 3 is an oblique view showing the front, bottom, and left side of adhesive pocket 100. FIG. 4 is an oblique view showing the back, top, and right side of adhesive pocket 100. Removable backing 118 covers adhesive layer 116 to prevent the adhesive from adhering to other surfaces prior to application of adhesive pocket 100 to a mobile phone by a user. The user removes removable backing 118 to expose adhesive layer 116. The exposed surface of adhesive layer 116 is then applied by the user to the mobile phone or mobile phone case, thereby affixing the pocket to the mobile phone or phone case. FIG. 5 shows adhesive pocket 100 affixed to a mobile phone 500.

Figure 6:
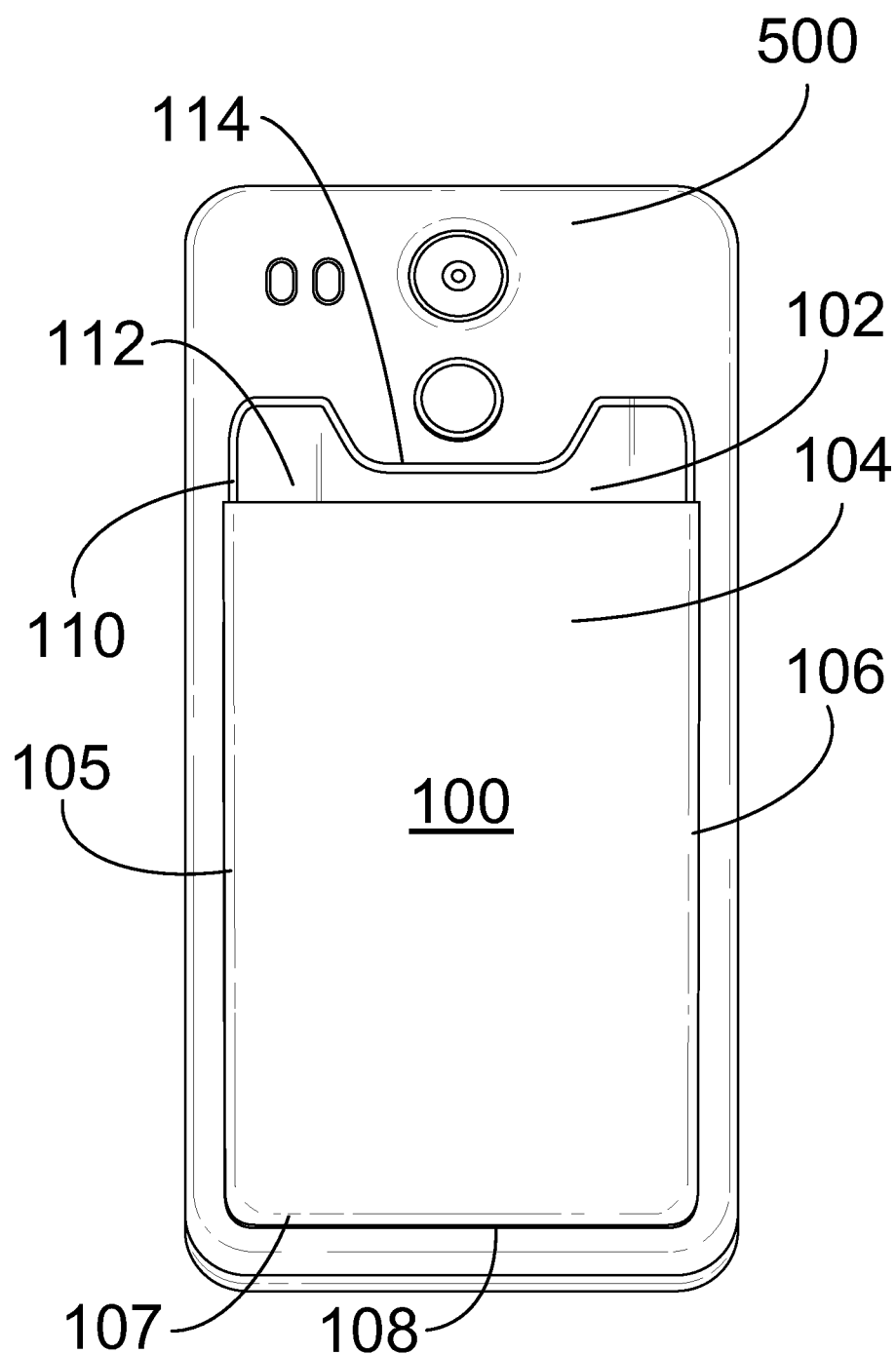
FIG. 6 is a photograph showing an adhesive pocket affixed to a mobile phone in accordance with one or more embodiments of the present invention.
Figure 7:
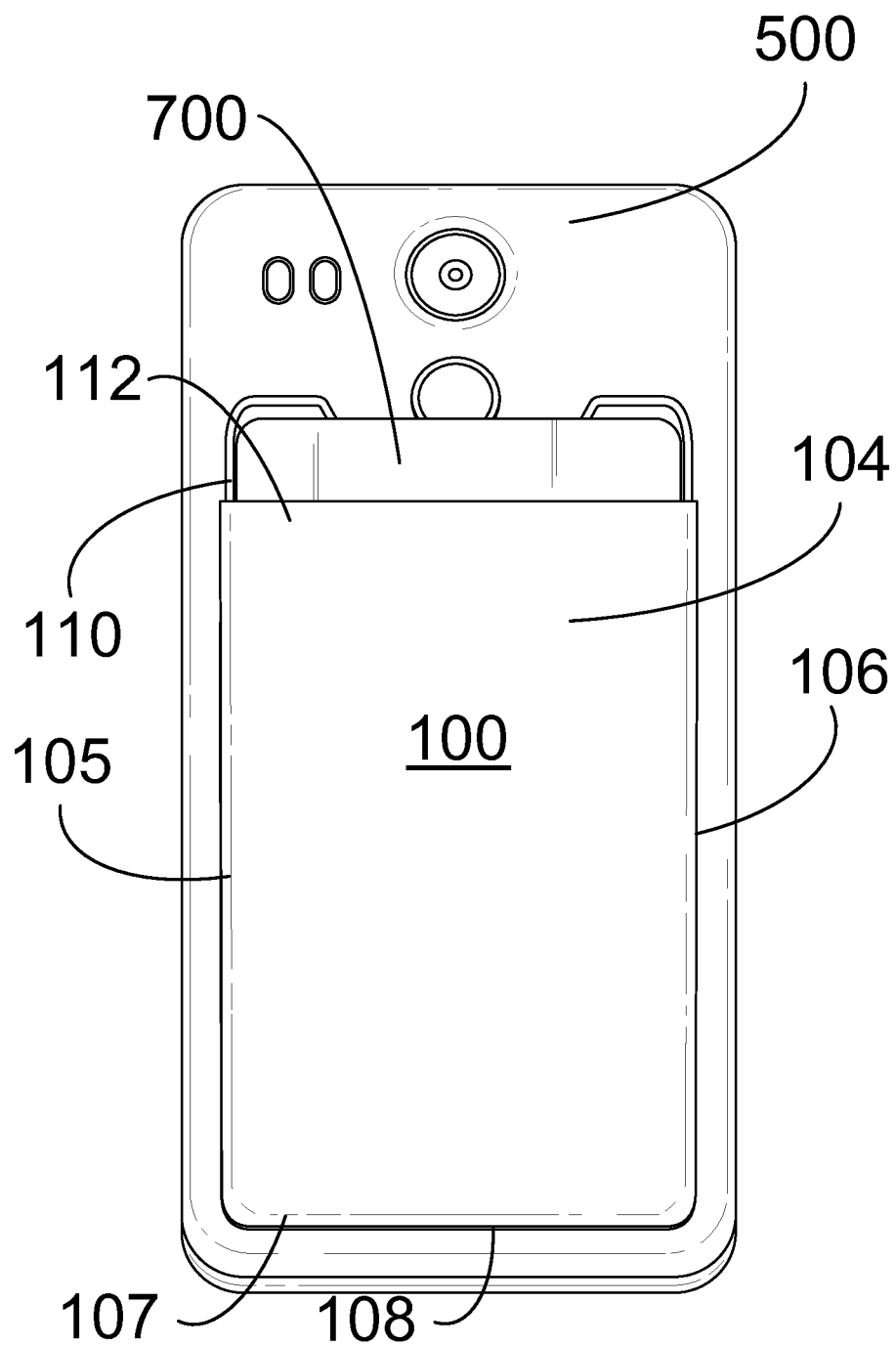
FIG. 7 is a photograph showing an adhesive pocket affixed to a mobile phone in which a credit card is disposed within the adhesive pocket in accordance with one or more embodiments of the present invention.
Figure 8:
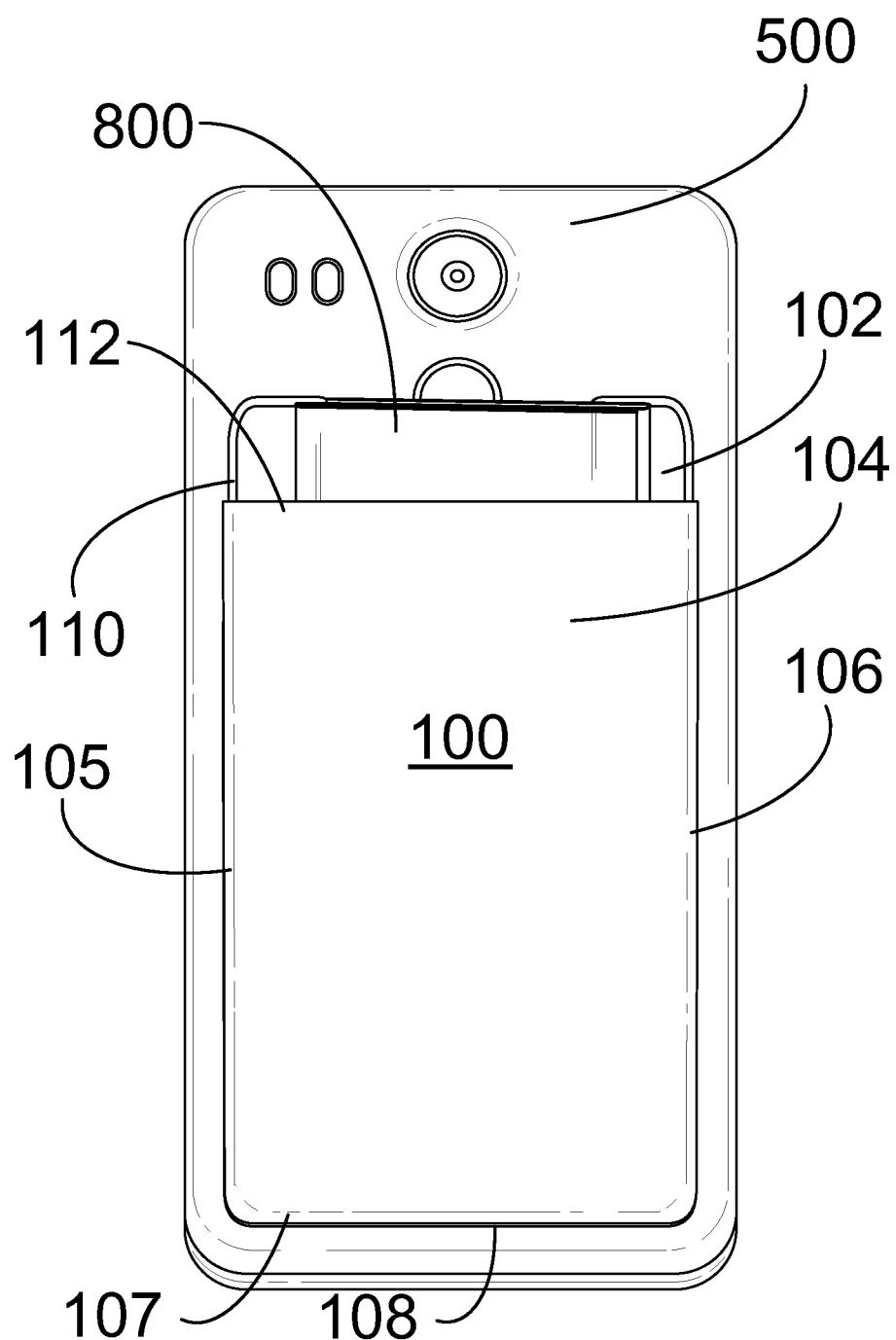
FIG. 8 is a photograph showing an adhesive pocket affixed to a mobile phone in which a folded paper bill is disposed within the adhesive pocket in accordance with one or more embodiments of the present invention.

FIG. 6 is a photograph showing adhesive pocket 100 affixed to mobile phone 500 in accordance with one or more embodiments of the present invention. Edge 112, at the pocket opening where cards and items are inserted and removed from the pocket, can be reinforced by stitching as shown. FIG. 7 is a photograph showing adhesive pocket 100 affixed to mobile phone 500 in which credit card 700 is disposed within adhesive pocket 100. FIG. 8 is a photograph showing adhesive pocket 100 affixed to mobile phone 500 in which folded paper bill 800 is disposed within adhesive pocket 100.

Figure 9:
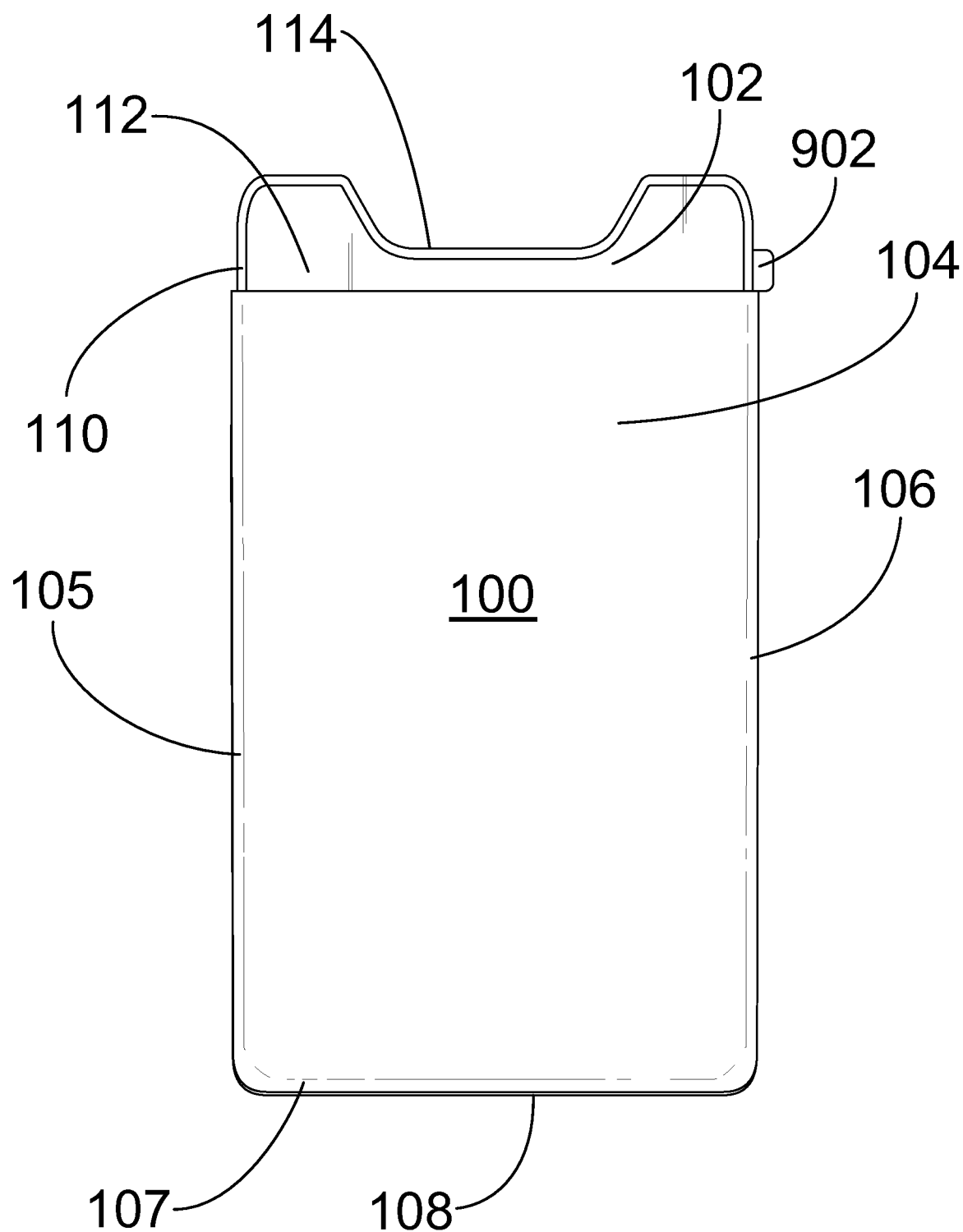
FIG. 9 is a photograph showing an adhesive pocket in accordance with one or more embodiments of the present invention.
Figure 10:
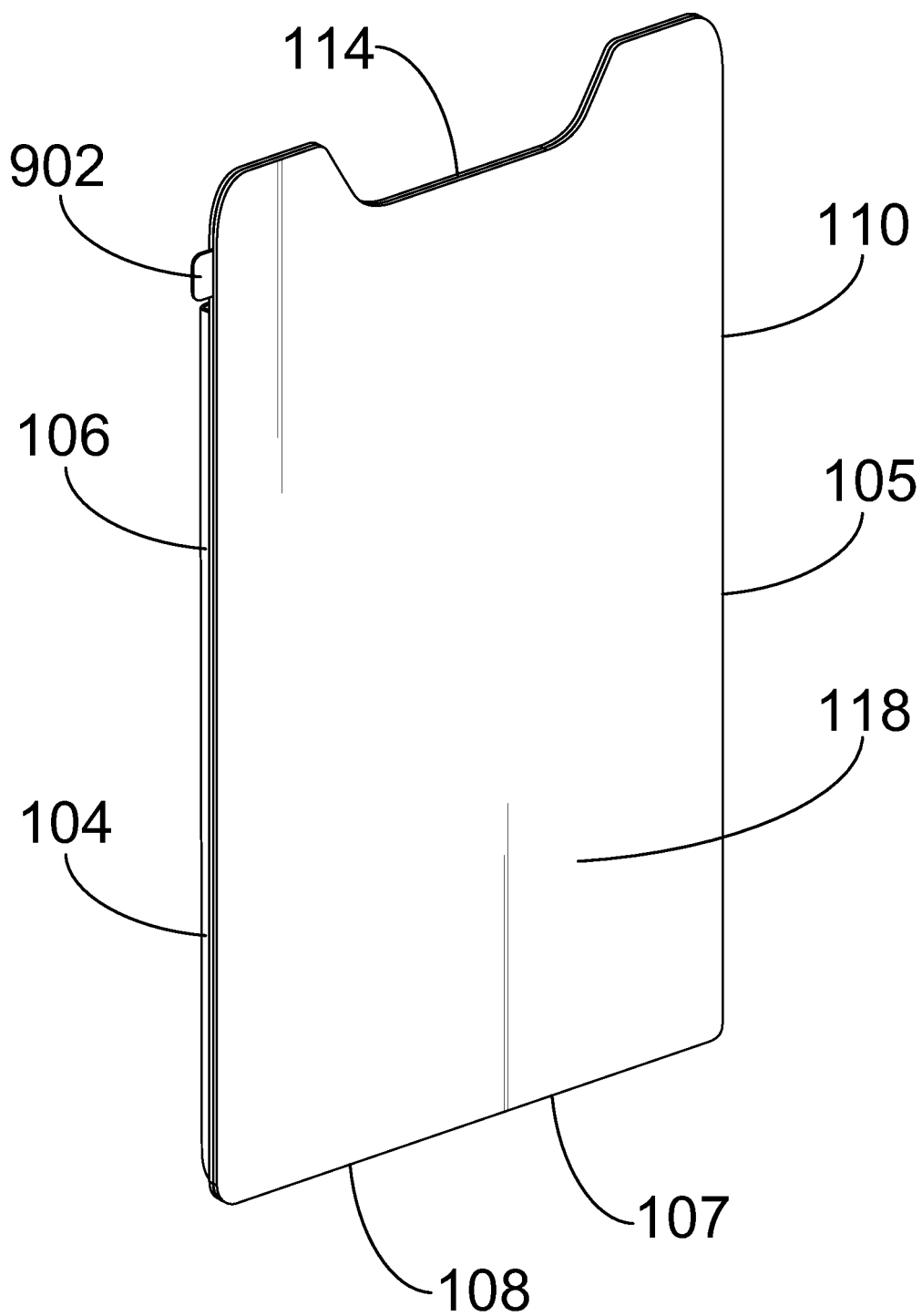
FIG. 10 is a photograph showing an adhesive pocket having a removable backing in accordance with one or more embodiments of the present invention.
Figure 11:
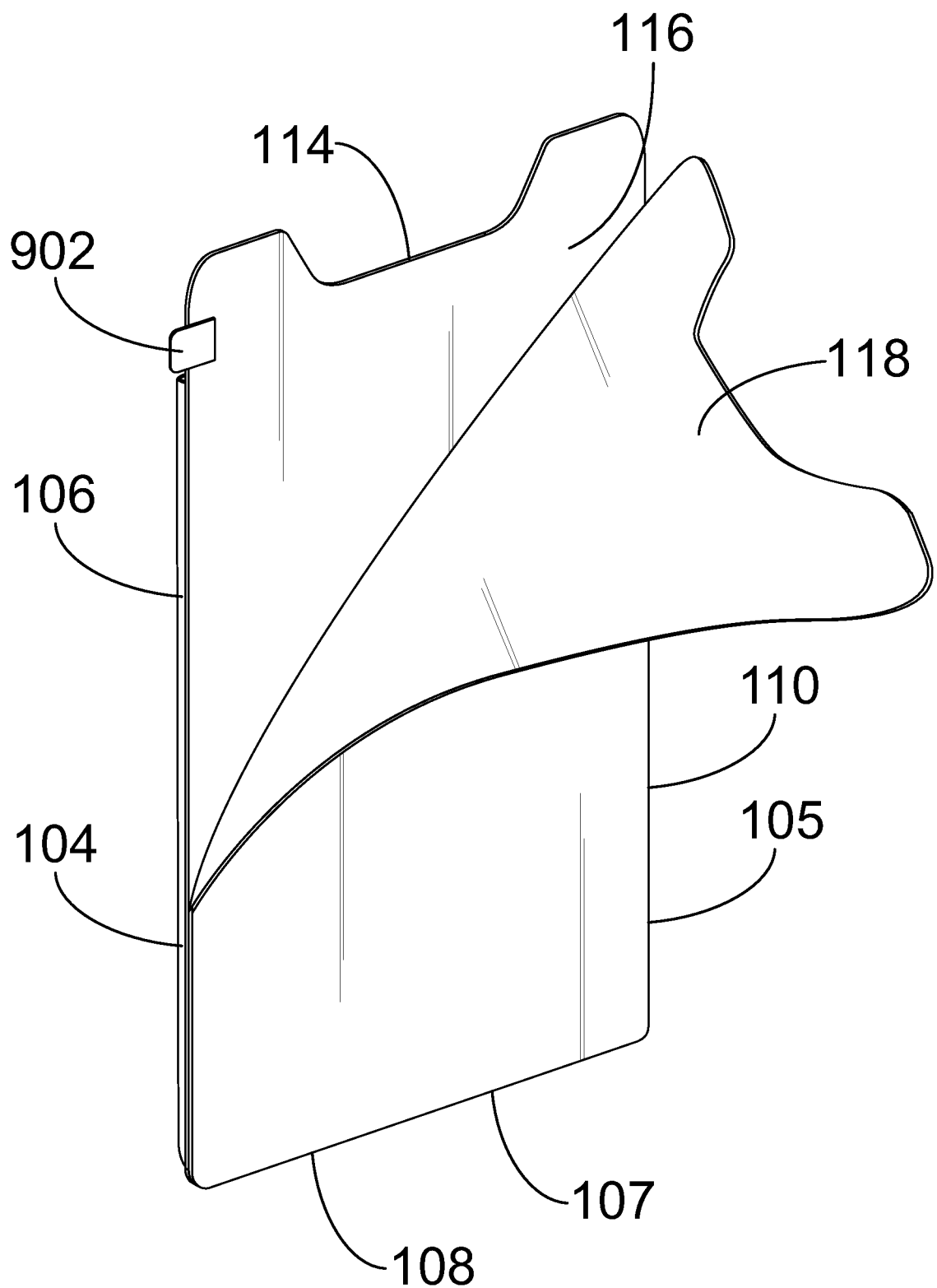
FIG. 11 is a photograph showing an adhesive pocket having a removable backing in accordance with one or more embodiments of the present invention, in which a portion of the removable backing is peeled back revealing the adhesive layer and the elastic sheet.

FIG. 9 is a photograph showing the front of adhesive pocket 100 in accordance with one or more embodiments of the present invention. FIG. 10 is a photograph the back of adhesive pocket 100 and removable backing 118. Pull tab 902 can be included between adhesive layer 116 and removable backing 118 to facilitate the separation of removable backing 118 from adhesive layer 116. Pull tab 902 can be removed after separating removable backing 118 from adhesive layer 116 and prior to affixing adhesive pocket 100 to the back of mobile phone 500. FIG. 11 is a photograph showing adhesive pocket 100 removable backing 118, and removable pull tab 902, in which a portion of removable backing 118 is peeled back from adhesive layer 116 revealing the transparent adhesive layer and elastic sheet 104 underneath transparent adhesive layer 116. Adhesive layer 116 is disposed entirely on elastic sheet 114. No part of adhesive layer 116 is disposed on base 102. To affix adhesive pocket 100 to a mobile phone, the user completely removes removable backing 118 to fully expose adhesive layer 116, which can then be applied to the back of the mobile phone or mobile phone case.

A preferred method or apparatus of the present invention has many novel aspects, and because the invention can be embodied in different methods or apparatuses for different purposes, not every aspect need be present in every embodiment. Moreover, many of the aspects of the described embodiments may be separately patentable. The invention has broad applicability and can provide many benefits as described and shown in the examples above. The embodiments will vary greatly depending upon the specific application, and not every embodiment will provide all of the benefits and meet all of the objectives that are achievable by the invention.

In the following discussion and in the claims, the terms "including" and "comprising" are used in an open-ended fashion, and thus should be interpreted to mean "including, but not limited to . . . ." To the extent that any term is not specially defined in this specification, the intent is that the term is to be given its plain and ordinary meaning. The accompanying drawings are intended to aid in understanding the present invention and, unless otherwise indicated, are not necessarily drawn to scale. The various features described herein may be used in any functional combination or sub-combination, and not merely those combinations described in the embodiments herein. As such, this disclosure should be interpreted as providing written description of any such combination or sub-combination.

Although the present invention and its advantages have been described in detail, it should be understood that various changes, substitutions and alterations can be made to the embodiments described herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. An adhesive pocket for mobile phones comprising:
    a base having a front, a back, a first side, a second side, a top, and a bottom;
    an elastic sheet affixed to the back of the base, the elastic sheet wrapped around the first side of the base and extending across the front of the base to the second side of the base, the elastic sheet sealed at the bottom of the base, and the elastic sheet sealed at the second side of the base, thereby forming a pocket between the elastic sheet and the front of the base;
    an adhesive layer disposed on the elastic sheet; and
    a removable backing disposed on the adhesive layer, the removable backing configured to expose the adhesive layer when removed.

2. The adhesive pocket of claim 1, in which the adhesive layer is disposed on a portion of the elastic sheet that is affixed to the back of the base.

3. The adhesive pocket of claim 1, in which no portion of the adhesive layer is in contact with the base.

4. The adhesive pocket of claim 1, in which the adhesive layer is disposed between the elastic sheet and the removable backing.

5. The adhesive pocket of claim 1, in which a pull tab is disposed between the adhesive layer and the removable backing.

6. The adhesive pocket of claim 1, in which the pocket is adapted in size and shape to carry credit-card-sized items.

7. The adhesive pocket of claim 1, in which the elastic sheet is selected from a group of materials comprising: lycra, spandex, and elastane.

8. The adhesive pocket of claim 1, in which the adhesive layer comprises acrylic adhesive.

9. The adhesive pocket of claim 1, in which the base is selected from a group of semi-flexible materials comprising: thick paper, cardboard, polycarbonate.

10. A mobile phone having the adhesive pocket of claim 1 affixed to at least a portion of the mobile phone.

11. A mobile phone case having the adhesive pocket of claim 1 affixed to at least a portion of the mobile phone case.

12. A method of making an adhesive pocket for mobile phones adapted in size and shape to carry credit-card-sized items comprising:
    providing a base having a front, a back, a first side, a second side, a top, and a bottom;
    affixing an elastic sheet to the back of the base;
    forming a pocket between the elastic sheet and the front of the base by:
        wrapping the elastic sheet around the first side of the base so that the elastic sheet extends across the front of the base to the second side of the base;
        sealing the elastic sheet at the bottom of the base;
        sealing the elastic sheet at the second side of the base;
    disposing an adhesive layer on the elastic sheet;
    disposing a removable backing on adhesive layer, the removable backing configured to expose the adhesive layer when removed.

13. The method of claim 12, further comprising disposing the elastic sheet on a portion of the elastic sheet that is affixed to the back of the base.

14. The method of claim 12, in which no portion of the adhesive layer is in contact with the base.

15. The method of claim 12, in which the adhesive layer is disposed between the elastic sheet and the removable backing.

16. The method of claim 12, in which the pocket is adapted in size and shape to carry credit-card-sized items.

17. The method of claim 12, in which the elastic sheet is selected from a group of materials comprising: lycra, spandex, and elastane.

18. The method of claim 12, in which the adhesive layer comprises acrylic adhesive.

19. The method of claim 12, in which the base is selected from a group of semi-flexible materials comprising: thick paper, cardboard, and polycarbonate.

* * * * *